(12) United States Patent
Liu et al.

(10) Patent No.: US 10,610,901 B2
(45) Date of Patent: Apr. 7, 2020

(54) WHEEL CLEANING AND BLOWING DEVICE AND METHOD

(71) Applicant: CITIC Dicastal CO., LTD., Qinhuangdao, Hebei (CN)

(72) Inventors: Huiying Liu, Qinhuangdao (CN); Xin He, Qinhuangdao (CN)

(73) Assignee: CITIC Dicastal CO., LTD., Qinhuangdao, Hebei (CN)

( * ) Notice: Subject to any disclaimer, the term of this patent is extended or adjusted under 35 U.S.C. 154(b) by 154 days.

(21) Appl. No.: 15/887,107

(22) Filed: Feb. 2, 2018

(65) Prior Publication Data

US 2019/0193121 A1    Jun. 27, 2019

(30) Foreign Application Priority Data

Dec. 25, 2017    (CN) .......................... 2017 1 1417907

(51) Int. Cl.
| | |
|---|---|
| *B05B 9/03* | (2006.01) |
| *B05B 13/02* | (2006.01) |
| *B08B 3/02* | (2006.01) |
| *B08B 5/02* | (2006.01) |
| *B60S 3/04* | (2006.01) |
| *F26B 15/00* | (2006.01) |
| *F26B 21/00* | (2006.01) |
| *F26B 25/02* | (2006.01) |

(52) U.S. Cl.
CPC .............. *B08B 3/022* (2013.01); *B05B 9/035* (2013.01); *B05B 13/0235* (2013.01); *B08B 5/023* (2013.01); *B60S 3/042* (2013.01); *F26B 15/00* (2013.01); *F26B 21/004* (2013.01); *F26B 25/02* (2013.01); *B08B 2203/0258* (2013.01)

(58) Field of Classification Search
CPC ..... B05B 9/035; B05B 13/0235; B08B 3/022; B08B 5/023; B08B 2203/0258; B60S 3/042; F26B 15/00; F26B 21/004; F26B 25/02
USPC .................................. 134/72, 123, 131, 198
See application file for complete search history.

(56) References Cited

U.S. PATENT DOCUMENTS

2015/0273493 A1 * 10/2015 Xue ..................... B05B 13/0228
                                                         239/224

* cited by examiner

*Primary Examiner* — Levon J Shahinian
(74) *Attorney, Agent, or Firm* — Cooper Legal Group, LLC

(57) ABSTRACT

The invention discloses a wheel cleaning and blowing device, which is composed of four systems: a wheel positioning system, which completes initial positioning of a wheel on a roller bed and finds the position of a valve hole; a wheel advancing and dry-wet conversion system, in which the wheel advances while rotating, thus completing double-station dry-wet conversion of the wheel; a high-pressure water cleaning system, which is matched with the advancing rotating wheel to clean the wheel; and a compressed air blowing system, which is matched with the advancing rotating wheel to blow the wheel uniformly. The invention simultaneously discloses a wheel cleaning and blowing method. By adopting the device and the method, the wheel moves forward all the time during cleaning and blowing, the cycle is short, the efficiency is high, cleaning and blowing are integrated, and dry-wet separation is realized.

2 Claims, 8 Drawing Sheets

WHEEL CLEANING AND BLOWING DEVICE AND METHOD

CROSS-REFERENCE TO RELATED APPLICATIONS

This application is filed based upon and claims priority to Chinese Patent Application No. 201711417907.8, filed on Dec. 25, 2017, the entire contents of which are incorporated herein by reference.

BACKGROUND

After a wheel is turned and drilled, chips and emulsion may be left on the surface, and before air tightness detection, balance detection and run-out detection, the wheel needs to be cleaned and blown. In actual production, we often encounter the problems that the wheel is not cleaned thoroughly, aluminum chips remain and the like. A wheel cleaning and blowing device is urgently needed. By integrating cleaning and blowing, dry-wet separation is realized, and the wheel advances while rotating.

SUMMARY

The disclosure relates to the technical field of wheels, and specifically, to a wheel cleaning and blowing device and method.

A wheel cleaning and blowing device and method are provided, which can be used for automatic continuous production. The device is novel in structure, accurate, efficient, and advanced in technology.

In one embodiment of the disclosure, a wheel cleaning and blowing device is composed of a frame, a lower servo motor, a bearing seat, a shaft, a bearing, a rotating disk, guide rails, a sliding table I, a sliding table II, a gear rack, an upper servo motor, a coupling, a servo motor I, a turntable I, an electric cylinder I, guide posts, a servo motor II, a turntable II, an electric cylinder II, flange plates, central posts, bolt hole posts, a concave support plate, positioning guide rails, a clamping cylinder, servo motors III, a left sliding plate, a positioning gear rack, a right sliding plate, positioning wheels, a vision sensor, a high-pressure water tank, a step water spray rack, nozzles, an air compressor, a step blowing rack, air outlets and a dry-wet separation plate.

The wheel cleaning and blowing device is composed of four systems: a wheel positioning system, which completes initial positioning of a wheel on a roller bed and finds the position of a valve hole; a wheel advancing and dry-wet conversion system, in which the wheel advances while rotating, thus completing double-station dry-wet conversion of the wheel; a high-pressure water cleaning system, which is matched with the advancing rotating wheel to clean the wheel; and a compressed air blowing system, which is matched with the advancing rotating wheel to blow the wheel uniformly.

The opening of the concave support plate is on the right side, the left side of the concave support plate is fixed on the side of the frame, and the four positioning guide rails are symmetrically mounted on the concave support plate. The left sliding plate and the right sliding plate are symmetrically mounted on the positioning guide rails and connected with each other via the positioning gear rack, the output end of the clamping cylinder is connected with the left sliding plate to control the left sliding plate and the right sliding plate to move synchronously, the servo motors III are fixed below the left sliding plate and the right sliding plate, and the positioning wheels are mounted at the output ends of the servo motors III. After the wheel enters the roller bed, the clamping cylinder is started to drive the left sliding plate and the right sliding plate to move synchronously, the wheel is initially positioned by the four positioning wheels, the servo motors III are started, the positioning wheels rotate, the wheel is driven to rotate, and the valve hole rotating to a position below the vision sensor is recognized. This is the wheel positioning system, which completes initial positioning of the wheel on the roller bed and finds the position of the valve hole.

The lower servo motor is mounted in the center of the bottom of the frame, the output end of the lower servo motor is connected with the rotating disk to control the rotating disk to rotate, the four guide rails are symmetrically mounted on the rotating disk, the sliding table I and the sliding table II are mounted on the guide rails in a bilaterally symmetric manner and connected with each other via the gear rack, the upper servo motor is fixed on the rotating disk, the output end of the upper servo motor is connected with a gear in the gear rack, and the sliding table I and the sliding table II move synchronously by driving the gear to rotate. The servo motor I is mounted on the sliding table I, and the output end thereof is connected with the turntable I to control the turntable I to rotate. The electric cylinder I is fixed on the turntable I, the output end thereof is connected with a flange plate to control the flange plate under the guidance of a guide post to ascend and descend, and this is a left station. The structure on the sliding table II is completely same as that on the sliding table I, the servo motor II is mounted on the sliding table II, and the output end thereof is connected with the turntable II to control the turntable II to rotate. The electric cylinder II is fixed on the turntable II, the output end thereof is connected with a flange plate to control the flange plate under the guidance of a guide post to ascend and descend, and this is a right station. The central posts and the bolt hole posts are fixed on the flange plates, the diameter of the central posts and the diameter, number and pitch diameter of the bolt hole posts are determined according to the produced wheel. After the wheel is positioned by the positioning system, the position of the valve hole is determined, and according to the included angles between bolt holes and the valve hole, the servo motor I is started to drive the flange plates to rotate, so that the bolt hole posts can be just located below the bolt holes of the wheel. The electric cylinder I is started to drive the flange plates to ascend from the initial low positions, meanwhile, the positioning wheels are reset, after the flange plates contact the flange face of the wheel and the bolt hole posts are inserted into the bolt holes, the wheel can be jacked to leave the roller bed, and the wheel on the sliding table I ascends to a preset high position. In the initial state, the flange plate on the sliding table I is at the preset low position, the flange plate on the sliding table II is at the preset high position, and the flange plate on the sliding table II descends to the low position while the flange plate on the sliding table I jacks the wheel to the high position. The upper servo motor is started to drive the sliding table I and the sliding table II to move synchronously to the center, i.e., the wheel moves forward from left to right, and when the wheel moves forward, the servo motor I is started to drive the wheel under the torque action of the bolt hole posts to rotate, so that the wheel advances while rotating. After the wheel is cleaned with high-pressure water, the lower servo motor is started to drive the rotating disk to rotate 180 degrees, the left station and the right station are exchanged, at the moment, the wheel enters the blowing system from the cleaning system, the cleaning system is separated from the blowing system by the dry-wet separation plate, and only a window through which the wheel can pass during station exchange is reserved. After the wheel enters the blowing system, the upper servo motor drives the sliding table I and the sliding table II to move synchronously to two ends, i.e., the wheel continues advancing while rotating and is blown. This is the wheel advancing and dry-wet conversion system, in which the wheel advances while rotating, thus completing double-station dry-wet conversion of the wheel.

The high-pressure water tank is located at the left top of the frame to discharge high-pressure water, and the step water spray rack is fixed on the frame. The step water spray rack has double steps symmetrically distributed 45 degrees, the top nozzle is used for cleaning the front center of the wheel, the nozzles on two sides of the first step are used for cleaning the front of the wheel, the high-pressure water enters the inner rim of the wheel from the window to clean the inner side of the wheel, the nozzles on two sides of the second step are used for cleaning the outer rim of the wheel, the wheel rotating while advancing can be cleaned in all directions under the action of centrifugal force, and this is the high-pressure water cleaning system.

The air compressor is located at the right top of the frame to discharge compressed air, the step blowing rack is same as the step water spray rack in structure and also has double steps symmetrically distributed 45 degrees, the top air outlet is used for blowing the front center of the wheel, the air outlets on two sides of the first step are used for blowing the front of the wheel, the air enters the inner rim of the wheel from the window to blow the inner side of the wheel, the air outlets on two sides of the second step are used for blowing the outer rim of the wheel, the wheel rotating while advancing can be blown uniformly, and this is the compressed air blowing system.

The working process of the wheel cleaning and blowing device is: according to the included angles between the valve hole and the bolt holes of the produced wheel, the circumferential positions of the bolt hole posts on the flange plates are adjusted, so that the bolt hole posts are just located below the bolt holes of the wheel; and in the initial state, the flange plate on the sliding table I is at the preset low position, the flange plate on the sliding table II is at the preset high position. After the wheel is positioned by the positioning system, cleaning and blowing are decomposed into four steps: step, the flange plate on the sliding table I ascends from the low position to the high position to jack the wheel to leave the roller bed, and the flange plate on the sliding table II descends from the preset high position to the low position; step, the upper servo motor is started to drive the sliding table I and the sliding table II to move synchronously to the center, i.e., the wheel moves forward from left to right, the servo motor I is started to drive the wheel to rotate, the wheel advances while rotating, the wheel entering the cleaning system is cleaned in all directions, the upper servo motor stops working after the wheel is cleaned, and the device enters a state of going to switch the left station and the right station; step, the lower servo motor is started to drive the rotating disk to rotate 180 degrees, the left station and the right station are exchanged, at the moment, the wheel enters the blowing system from the cleaning system, and the upper servo motor is restarted to drive the sliding table I and the sliding table II to move synchronously to two ends, i.e., the wheel continues advancing while rotating and is blown; and step, after the wheel is blown, the upper servo motor stops working, the idle sliding table II moves to the initial position of the left station, the sliding table I moves to the initial position of the right station, a manipulator takes the blown wheel away and puts it to a transfer roller bed, at the moment, the flange plate at the left station is at the low position, the flange plate at the right station is at the high position, the device is restored to the state of going to clean a wheel, next wheel is prepared for cleaning, and so on.

The device of the disclosure can be used for automatic continuous production, the wheel moves forward all the time during cleaning and blowing, the cycle is short, the efficiency is high, cleaning and blowing are integrated, dry-wet separation is realized, the wheel advances while rotating, the wheel is cleaned and blown thoroughly under the action of centrifugal force, and the device is good in stability and strong in uniformity.

Figure 1:
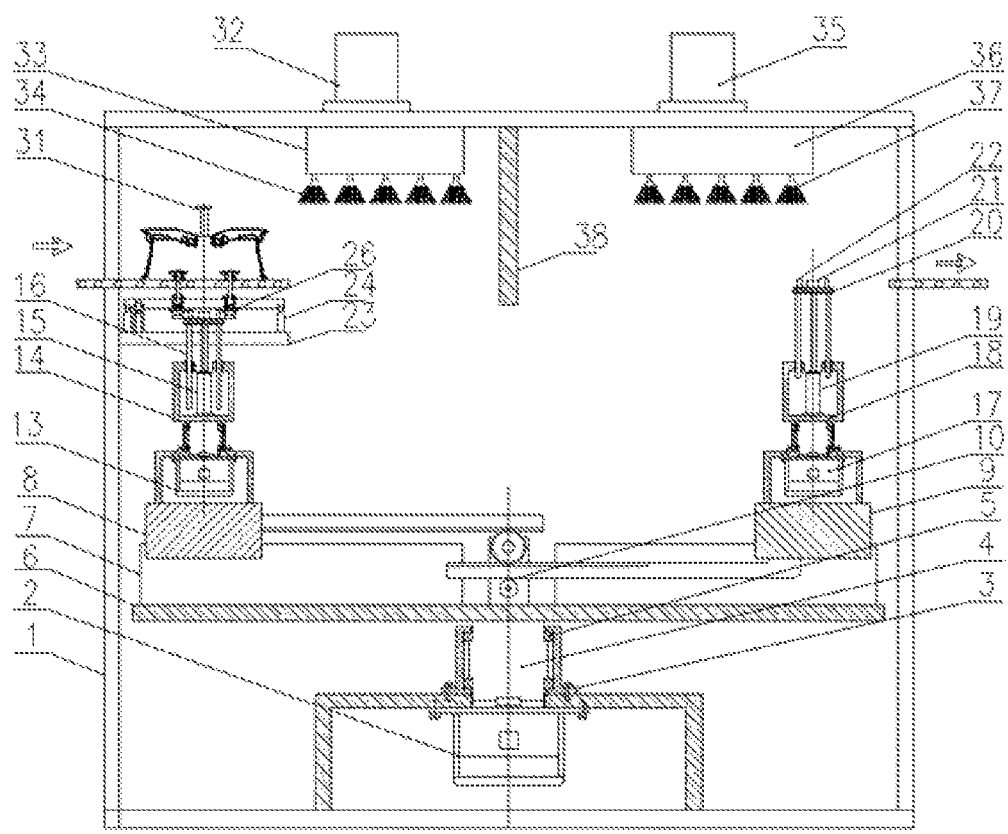
FIG. 1 is a front view of a wheel cleaning and blowing device of the disclosure.
Figure 2:
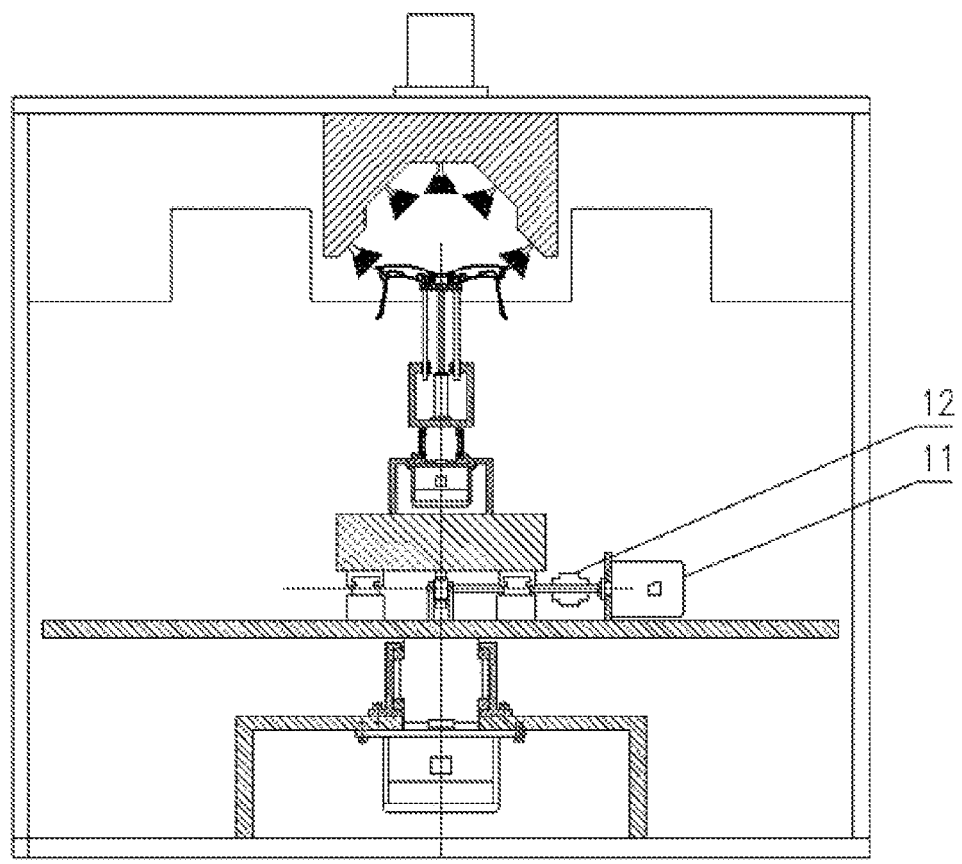
FIG. 2 is a left view of the wheel cleaning and blowing device of the disclosure.
Figure 3:
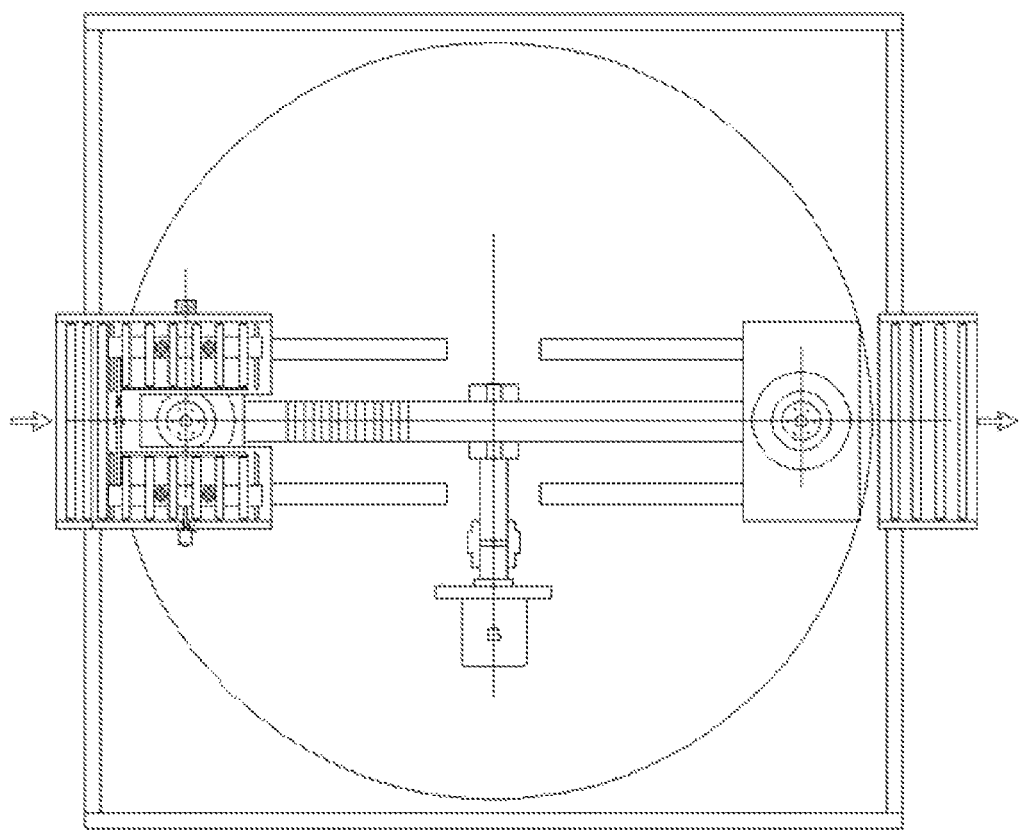
FIG. 3 is a top view of the wheel cleaning and blowing device of the disclosure.
Figure 4:
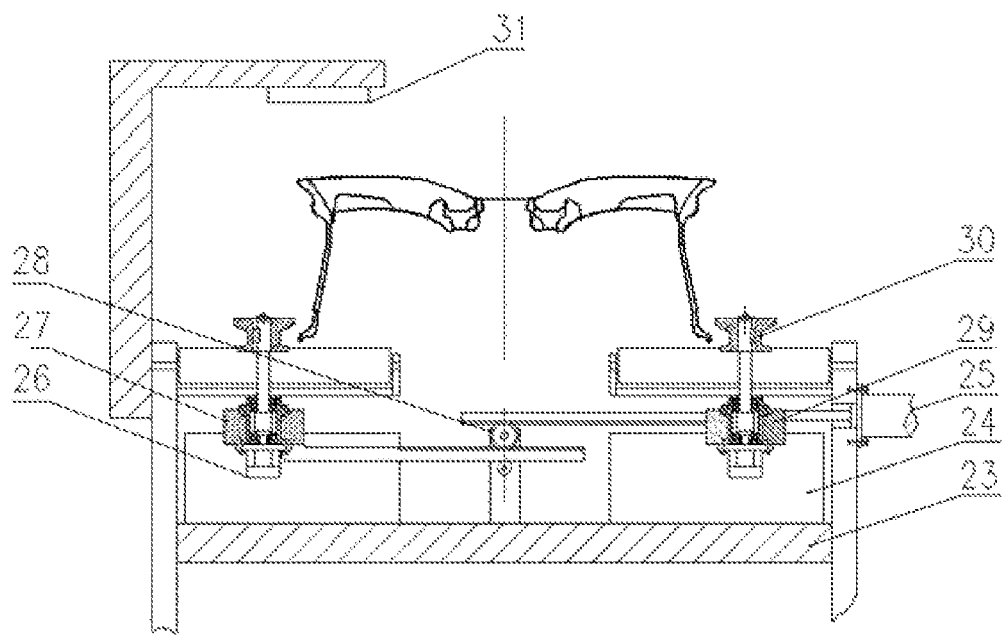
FIG. 4 is an enlarged left view of a positioning system of the wheel cleaning and blowing device of the disclosure.
Figure 5:
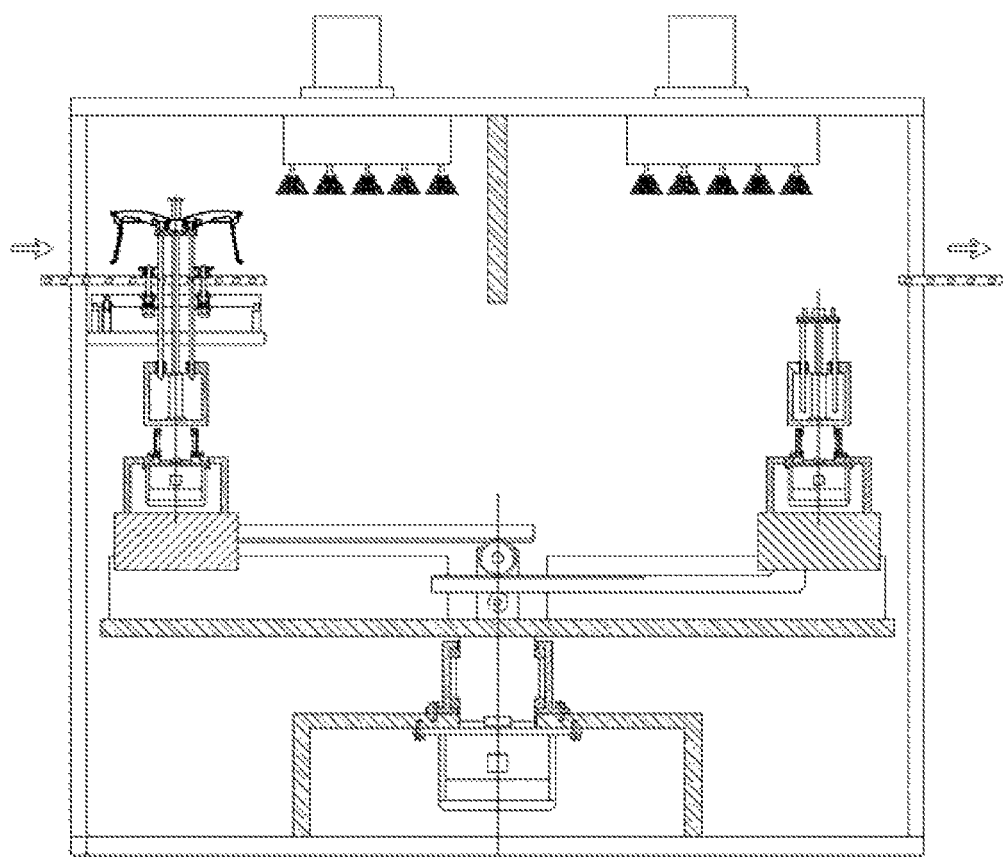
FIG. 5 is a schematic diagram of step 1 of the wheel cleaning and blowing device of the disclosure.
Figure 6:
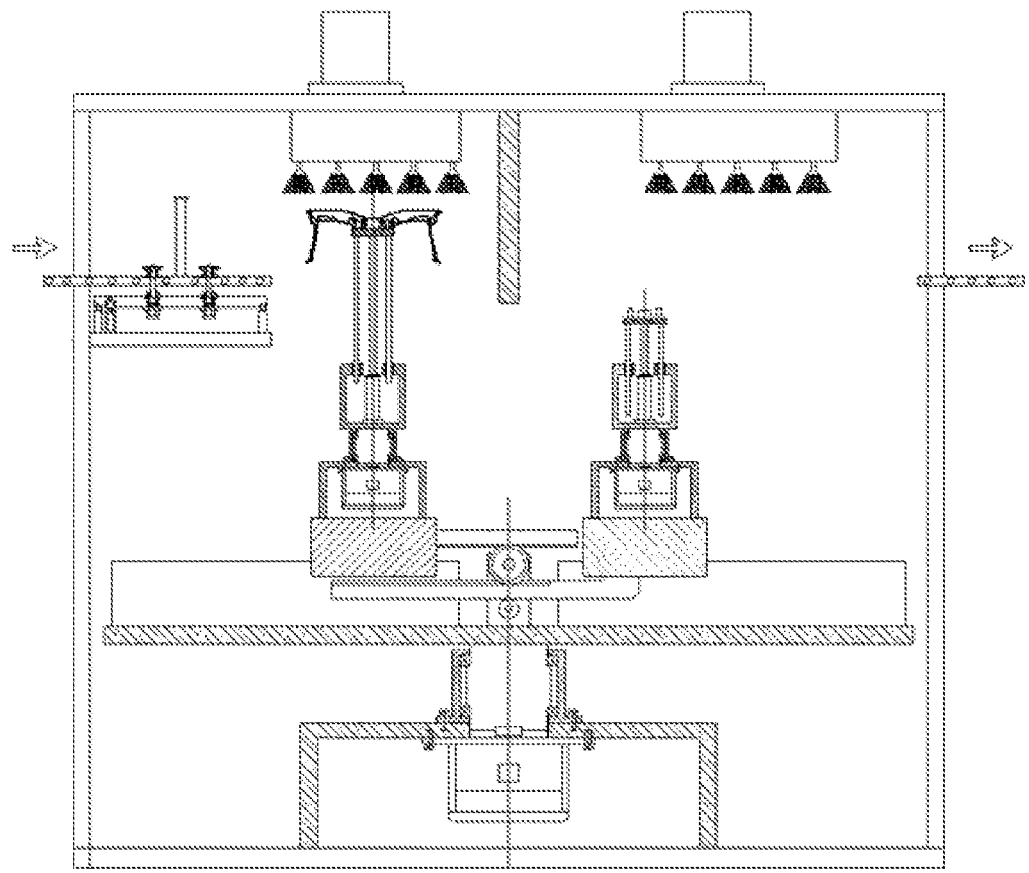
FIG. 6 is a schematic diagram of step 2 of the wheel cleaning and blowing device of the disclosure.
Figure 7:
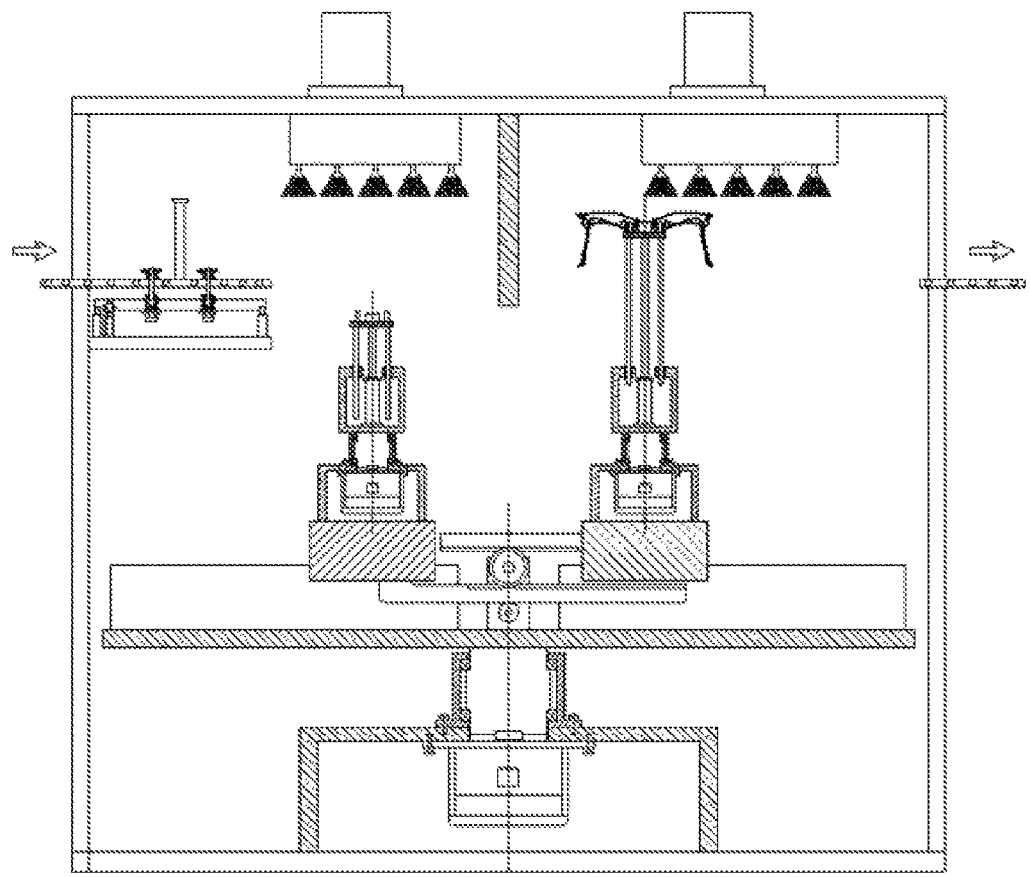
FIG. 7 is a schematic diagram of step 3 of the wheel cleaning and blowing device of the disclosure.
Figure 8:
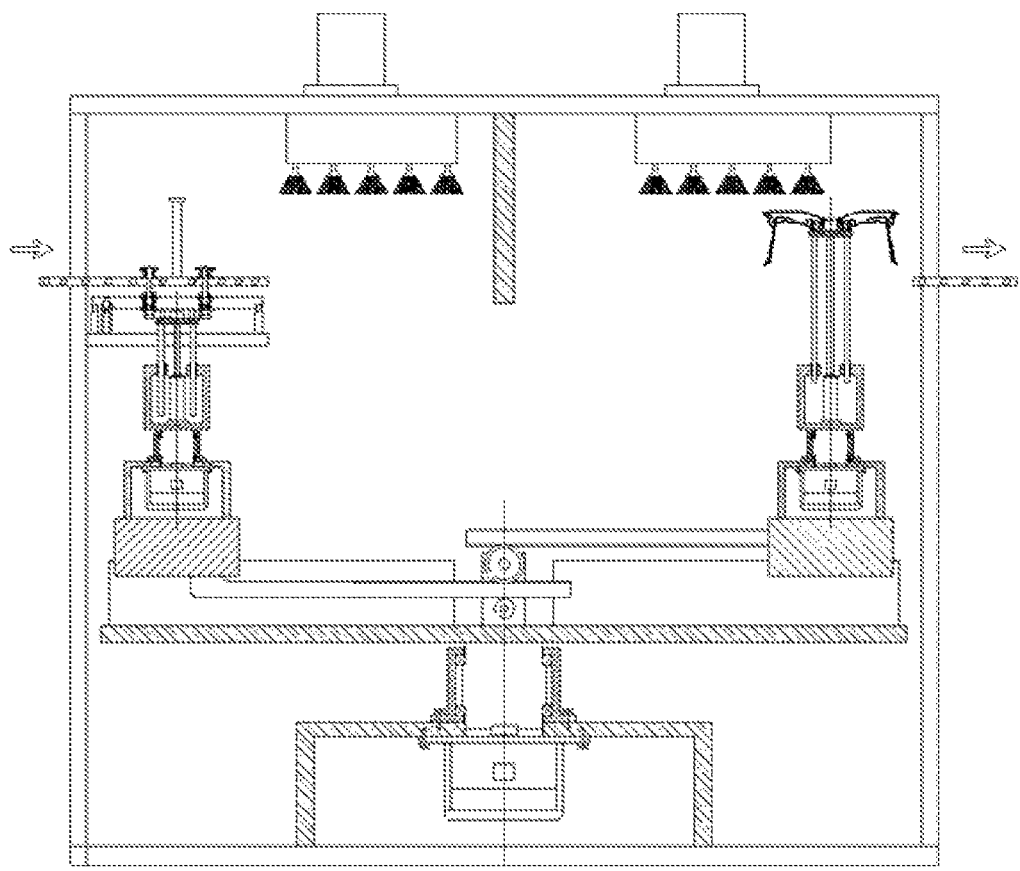
FIG. 8 is a schematic diagram of step 4 of the wheel cleaning and blowing device of the disclosure.

In which, 1—frame, 2—lower servo motor, 3—bearing seat, 4—shaft, 5—bearing, 6—rotating disk, 7—guide rail, 8—sliding table I, 9—sliding table II, 10—gear rack, 11—upper servo motor, 12—coupling, 13—servo motor I, 14—turntable I, 15—electric cylinder I, 16—guide post, 17—servo motor II, 18—turntable II, 19—electric cylinder II, 20—flange plate, 21—central post, 22—bolt hole post, 23—concave support plate, 24—positioning guide rail, 25—clamping cylinder, 26—servo motor III, 27—left sliding plate, 28—positioning gear rack, 29—right sliding plate, 30—positioning wheel, 31—vision sensor, 32—high-pressure water tank, 33—step water spray rack, 34—nozzle, 35—air compressor, 36—step blowing rack, 37—air outlet, 38—dry-wet separation plate.

DETAILED DESCRIPTION

Specific details and working conditions of a device provided by the disclosure will be given below in combination with the accompanying drawings.

A wheel cleaning and blowing device is composed of a frame 1, a lower servo motor 2, a bearing seat 3, a shaft 4, a bearing 5, a rotating disk 6, guide rails 7, a sliding table I 8, a sliding table II 9, a gear rack 10, an upper servo motor 11, a coupling 12, a servo motor I 13, a turntable I 14, an electric cylinder I 15, guide posts 16, a servo motor II 17, a turntable II 18, an electric cylinder II 19, flange plates 20, central posts 21, bolt hole posts 22, a concave support plate 23, positioning guide rails 24, a clamping cylinder 25, servo motors III 26, a left sliding plate 27, a positioning gear rack 28, a right sliding plate 29, positioning wheels 30, a vision sensor 31, a high-pressure water tank 32, a step water spray rack 33, nozzles 34, an air compressor 35, a step blowing rack 36, air outlets 37 and a dry-wet separation plate 38.

The wheel cleaning and blowing device is composed of four systems: a wheel positioning system, which completes initial positioning of a wheel on a roller bed and finds the position of a valve hole; a wheel advancing and dry-wet conversion system, in which the wheel advances while rotating, thus completing double-station dry-wet conversion of the wheel; a high-pressure water cleaning system, which is matched with the advancing rotating wheel to clean the wheel; and a compressed air blowing system, which is matched with the advancing rotating wheel to blow the wheel uniformly.

The opening of the concave support plate 23 is on the right side, the left side of the concave support plate 23 is fixed on the side of the frame 1, and the four positioning guide rails 24 are symmetrically mounted on the concave support plate 23. The left sliding plate 27 and the right sliding plate 29 are symmetrically mounted on the positioning guide rails 24 and connected with each other via the positioning gear rack 28, the output end of the clamping cylinder 25 is connected with the right sliding plate 29 to control the left sliding plate 27 and the right sliding plate 29 to move synchronously, the servo motors III 26 are fixed below the left sliding plate 27 and the right sliding plate 29, and the positioning wheels 30 are mounted at the output ends of the servo motors III 26. After the wheel enters the roller bed, the clamping cylinder 25 is started to drive the left sliding plate 27 and the right sliding plate 29 to move synchronously, the wheel is initially positioned by the four positioning wheels 30, the servo motors III 26 are started, the positioning wheels 30 rotate, the wheel is driven to rotate, and the valve hole rotating to a position below the vision sensor 31 is recognized. This is the wheel positioning system, which completes initial positioning of the wheel on the roller bed and finds the position of the valve hole.

The lower servo motor 2 is mounted in the center of the bottom of the frame 1, the output end of the lower servo motor 2 is connected with the rotating disk 6 to control the rotating disk 6 to rotate, the four guide rails 7 are symmetrically mounted on the rotating disk 6, the sliding table I 8 and the sliding table II 9 are mounted on the guide rails 7 in a bilaterally symmetric manner and connected with each other via the gear rack 10, the upper servo motor 11 is fixed on the rotating disk 6, the output end of the upper servo motor 11 is connected with a gear in the gear rack 10, and the sliding table I 8 and the sliding table II 9 move synchronously by driving the gear to rotate. The servo motor I 13 is mounted on the sliding table I 8, and the output end thereof is connected with the turntable I 14 to control the turntable I 14 to rotate. The electric cylinder I 15 is fixed on the turntable I 14, the output end thereof is connected with a flange plate 20 to control the flange plate 20 under the guidance of a guide post 16 to ascend and descend, and this is a left station. The structure on the sliding table II 9 is completely same as that on the sliding table I 8, the servo motor II 17 is mounted on the sliding table II 9, and the output end thereof is connected with the turntable II 18 to control the turntable II 18 to rotate. The electric cylinder II 19 is fixed on the turntable II 18, the output end thereof is connected with a flange plate 20 to control the flange plate 20 under the guidance of a guide post 16 to ascend and descend, and this is a right station. The central posts 21 and the bolt hole posts 22 are fixed on the flange plates 20, the diameter of the central posts 21 and the diameter, number and pitch diameter of the bolt hole posts 22 are determined according to the produced wheel. After the wheel is positioned by the positioning system, the position of the valve hole is determined, and according to the included angles between bolt holes and the valve hole, the servo motor I 13 is started to drive the flange plates 20 to rotate, so that the bolt hole posts 22 can be just located below the bolt holes of the wheel. The electric cylinder I 15 is started to drive the flange plates 20 to ascend from the initial low positions, meanwhile, the positioning wheels 30 are reset, after the flange plates 20 contact the flange face of the wheel and the bolt hole posts 22 are inserted into the bolt holes, the wheel can be jacked to leave the roller bed, and the wheel on the sliding table I 8 ascends to a preset high position. In the initial state, the flange plate 20 on the sliding table I 8 is at the preset low position, the flange plate 20 on the sliding table II 9 is at the preset high position, and the flange plate 20 on the sliding table II 9 descends to the low position while the flange plate 20 on the sliding table I 8 jacks the wheel to the high position. The upper servo motor 11 is started to drive the sliding table I 8 and the sliding table II 9 to move synchronously to the center, i.e., the wheel moves forward from left to right, and when the wheel moves forward, the servo motor I 13 is started to drive the wheel under the torque action of the bolt hole posts 22 to rotate, so that the wheel advances while rotating. After the wheel is cleaned with high-pressure water, the lower servo motor 2 is started to drive the rotating disk 6 to rotate 180 degrees, the left station and the right station are exchanged, at the moment, the wheel enters the blowing system from the cleaning system, the cleaning system is separated from the blowing system by the dry-wet separation plate 38, and only a window through which the wheel can pass during station exchange is reserved. After the wheel enters the blowing system, the upper servo motor 11 drives the sliding table I 8 and the sliding table II 9 to move synchronously to two ends, i.e., the wheel continues advancing while rotating and is blown. This is the wheel advancing and dry-wet conversion system, in which the wheel advances while rotating, thus completing double-station dry-wet conversion of the wheel.

The high-pressure water tank 32 is located at the left top of the frame 1 to discharge high-pressure water, and the step water spray rack 33 is fixed on the frame 1. The step water spray rack 33 has double steps symmetrically distributed 45 degrees, the top nozzle 34 is used for cleaning the front center of the wheel, the nozzles 34 on two sides of the first step are used for cleaning the front of the wheel, the high-pressure water enters the inner rim of the wheel from the window to clean the inner side of the wheel, the nozzles 34 on two sides of the second step are used for cleaning the outer rim of the wheel, the wheel rotating while advancing can be cleaned in all directions under the action of centrifugal force, and this is the high-pressure water cleaning system.

The air compressor 35 is located at the right top of the frame 1 to discharge compressed air, the step blowing rack 36 is same as the step water spray rack 33 in structure and also has double steps symmetrically distributed 45 degrees, the top air outlet 37 is used for blowing the front center of the wheel, the air outlets 37 on two sides of the first step are used for blowing the front of the wheel, the air enters the inner rim of the wheel from the window to blow the inner side of the wheel, the air outlets 37 on two sides of the second step are used for blowing the outer rim of the wheel, the wheel rotating while advancing can be blown uniformly, and this is the compressed air blowing system.

The working process of the wheel cleaning and blowing device is: according to the included angles between the valve hole and the bolt holes of the produced wheel, the circumferential positions of the bolt hole posts 22 on the flange plates 20 are adjusted, so that the bolt hole posts 22 are just located below the bolt holes of the wheel; and in the initial state, the flange plate 20 on the sliding table I 8 is at the preset low position, the flange plate 20 on the sliding table II 9 is at the preset high position. After the wheel is positioned by the positioning system, cleaning and blowing are decomposed into four steps: step 1, the flange plate 20 on the sliding table I 8 ascends from the low position to the high position to jack the wheel to leave the roller bed, and the flange plate 20 on the sliding table II 9 descends from the preset high position to the low position; step 2, the upper servo motor 11 is started to drive the sliding table I 8 and the sliding table II 9 to move synchronously to the center, i.e., the wheel moves forward from left to right, the servo motor I 13 is started to drive the wheel to rotate, the wheel advances while rotating, the wheel entering the cleaning system is cleaned in all directions, the upper servo motor 11 stops working after the wheel is cleaned, and the device enters a state of going to switch the left station and the right station; step 3, the lower servo motor 2 is started to drive the rotating disk 6 to rotate 180 degrees, the left station and the right station are exchanged, at the moment, the wheel enters the blowing system from the cleaning system, and the upper servo motor 11 is restarted to drive the sliding table I 8 and the sliding table II 9 to move synchronously to two ends, i.e., the wheel continues advancing while rotating and is blown; and step 4, after the wheel is blown, the upper servo motor 11 stops working, the idle sliding table II 9 moves to the initial position of the left station, the sliding table I 8 moves to the initial position of the right station, a manipulator takes the blown wheel away and puts it to a transfer roller bed, at the moment, the flange plate 20 at the left station is at the low position, the flange plate 20 at the right station is at the high position, the device is restored to the state of going to clean a wheel, next wheel is prepared for cleaning, and so on.

The device of the disclosure can be used for automatic continuous production, the wheel moves forward all the time during cleaning and blowing, the cycle is short, the efficiency is high, cleaning and blowing are integrated, dry-wet separation is realized, the wheel advances while rotating, the wheel is cleaned and blown thoroughly under the action of centrifugal force, and the device is good in stability and strong in uniformity.

The invention claimed is:
1. A wheel cleaning and blowing device, being composed of a frame, a lower servo motor, a bearing seat, a shaft, a bearing, a rotating disk, guide rails, a sliding table I, a sliding table II, a gear rack, an upper servo motor, a coupling, a servo motor I, a turntable I, an electric cylinder I, guide posts, a servo motor II, a turntable II, an electric cylinder II, flange plates, central posts, bolt hole posts, a concave support plate, positioning guide rails, a clamping cylinder, servo motors III, a left sliding plate, a positioning gear rack, a right sliding plate, positioning wheels, a vision sensor, a high-pressure water tank, a step water spray rack, nozzles, an air compressor, a step blowing rack, air outlets and a dry-wet separation plate; wherein the electric cylinder I is fixed on the turntable I, the output end thereof is connected with a flange plate to control the flange plate under the guidance of a guide post to ascend and descend, and this is a left station; the structure on the sliding table II is completely same as that on the sliding table I, the servo motor II is mounted on the sliding table II, and the output end thereof is connected with the turntable II to control the turntable II to rotate; the electric cylinder II is fixed on the turntable II, the output end thereof is connected with a flange plate to control the flange plate under the guidance of a guide post to ascend and descend, and this is a right station.
2. The wheel cleaning and blowing device according to claim 1, wherein in the initial state, the flange plate on the sliding table I is at a preset low position, and the flange plate on the sliding table II is at a preset high position.

\* \* \* \* \*